M. P. HOLMES.
MINING MACHINE TRUCK.
APPLICATION FILED NOV. 18, 1916.

1,378,809. Patented May 17, 1921.

Inventor:
Morris P. Holmes
by
Atty.

UNITED STATES PATENT OFFICE.

MORRIS P. HOLMES, OF CLAREMONT, NEW HAMPSHIRE, ASSIGNOR, BY MESNE ASSIGNMENTS, TO THE JEFFREY MANUFACTURING COMPANY, OF COLUMBUS, OHIO, A CORPORATION OF OHIO.

MINING-MACHINE TRUCK.

1,378,809.      Specification of Letters Patent.      Patented May 17, 1921.

Application filed November 18, 1916. Serial No. 132,121.

*To all whom it may concern:*

Be it known that I, MORRIS P. HOLMES, a citizen of the United States, residing at Claremont, in the county of Sullivan and State of New Hampshire, have invented certain new and useful Improvements in Mining-Machine Trucks, of which the following is a full, clear, and exact specification.

My invention relates to mining machine trucks.

It has for its object to provide an improved and simplified truck especially adapted to mining machine conditions, wherein it is desirable for the front end of the truck to be lowered in order to facilitate the removal of the machine from the truck, and wherein it desirable for the front end to remain in its lowered position in order to facilitate the return of the machine onto the truck after it has completed its cutting operation in a room. More specifically, my invention has for its object to provide such an improved truck whereby the construction and operation of the truck is materially simplified and the cost of the same is materially reduced. These and other objects and advantages of my improved construction will hereinafter more fully appear.

In the accompanying drawings, I have for purposes of illustration shown one embodiment which my invention may assume in practice.

In these drawings,—

Figure 1:
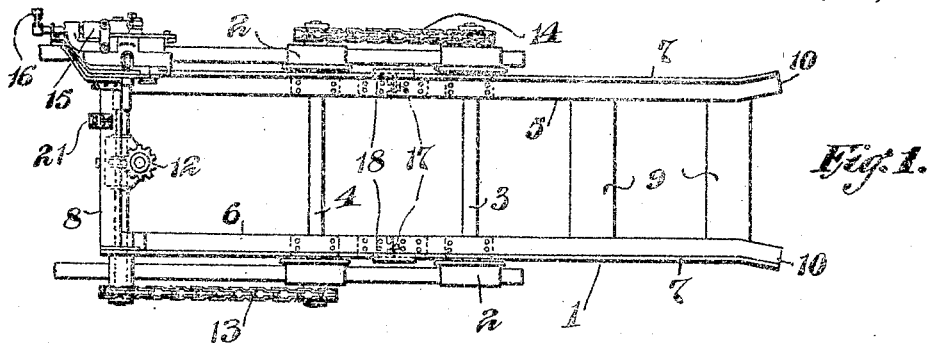
Figure 1 is a plan view of a mining machine truck equipped with my improvement.

In the illustrative construction, I have shown a mining machine truck 1 mounted upon pairs of front and rear wheels 2, carried on axles 3 and 4, which are in turn journaled in front and rear guiding frames 5 and 6, preferably formed of angle material and provided in the usual manner with upstanding guiding flanges 7, and connected by cross pieces 8 and 9 in such a manner as to produce rigid elements. As in the usual construction, the front end of the front guiding frame 5 is also flared, as shown at 10, in order to facilitate the removal of the machine at an angle thereto, or the return of the machine when the latter is disposed at an angle to the truck.

Truck driving mechanism of any suitable type is also mounted on the rear end of the frame 6, the same being connectible to any suitable moving part connected to the machine, as for instance to a gear 11, by any suitable means, as for instance by a pinion 12, and also being connected to the rear axle 4 through chain and sprocket mechanism 13, the rear axle being connected to the front axle through similar chain and sprocket mechanism 14, preferably on the opposite side of the machine. As in the usual construction, this truck driving mechanism preferably includes suitable clutch and brake mechanism 15 of well known construction, controlling the connection of the pinion 12 to the chain 13 and the speed of rotation of the wheels. While this mechanism *per se* forms no part of my present invention, it is preferably controlled by a single lever 16 adapted to apply the clutch and release the brake or release the clutch and apply the brake when thrown in opposite directions.

Figure 3:
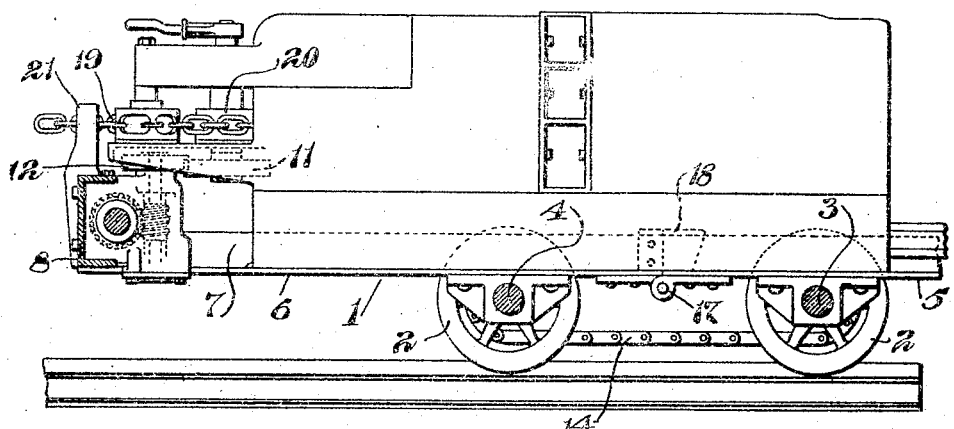
Fig. 3 is a side elevation of the truck with the machine in transverse position thereon.

In my improved construction, the adjacent ends of the frames 5 and 6 are suitably pivotally connected, preferably at a point between the axles 3 and 4, and by means of a hinge comprising one or more hinges 17 preferably disposed on the bottom of the angle members forming the side members of the frames, and adapted to open upward only and be held rigidly in the position shown in Fig. 3 when depressed as, for instance, when a machine is mounted on the truck. Obviously, I may also provide suitable side plates 18 on one of the frames adapted to inclose the joint between the frame members, and to assist in maintaining the parts in rigid position when the machine is on the truck. It is also obvious that, if desired, the abutting edges of the frame members above the hinge may be straight or cut-away in any desired angle, so long as the desired rigidity results when a weight is placed over the hinge.

Figure 2:
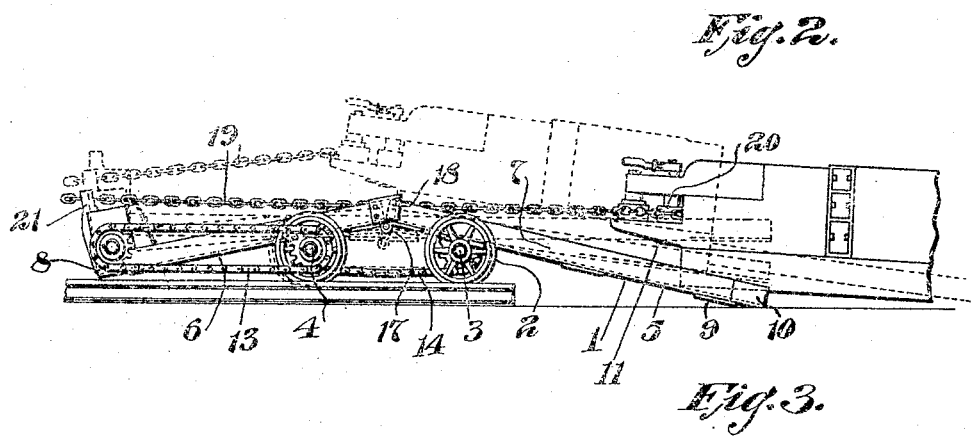
Fig. 2 is a side elevation of the truck shown in a plurality of positions, the machine also being indicated in a plurality of positions.

In the operation of my improved device, let us assume that the machine is in the position shown in Fig. 3, and that it is desired to unload the same from the truck. The brake mechanism 15 is first set. The feed chain or cable 19 of the machine, which, in the illustrative form of my invention shown, normally passes around a feed sprocket 20 at the rear of the machine, is then connected to a point adjacent the coal face, and the motor of the machine is operated in such a manner as to cause the machine to travel forward on the chain toward the face in a well known manner. Since the brake has been set, the rear wheels 2 are therefore locked so that the truck will remain stationary during this movement of the machine. As this movement continues, the machine will slide forward until the center of its weight has passed over the front axle 3, whereupon, due to the hinges 17, the front frame will then pivot about the front axle and assume the position shown in Fig. 2, wherein it will be noted that its front end is in engagement with the mine bottom and is inclined with respect to the truck so that it acts as a skid supporting the machine as the latter slides down onto the bottom. At the same time the rear frame 6, due to the elevation of the hinges and the weight of the truck driving mechanism on its rear end, will be depressed to the position shown in dotted lines in Fig. 2, the downward movement of its rear end, however, being arrested as soon as the front end of the front frame 5 strikes the bottom, which, as will be noted, occurs before the rear end of the rear frame 6 strikes the track on which the truck moves. It will also be noted that, due to the fact that the chain and sprocket connection 13 and the truck frame 6 both pivot about the rear axle 4, the brake, which has been set when the truck is moved into the room and before the machine is moved off of the same, will not be disturbed, the rear wheels therefore remaining locked and thereby maintaining the truck in its desired position. Obviously also, after the machine has moved down from the left hand dotted line position shown in Fig. 2 to the right hand full line position shown in that figure, and to the right therefrom toward the face, the truck frames will remain in the position shown in full lines in Fig. 2, due to the weight of the truck driving mechanism at the rear end of the rear frame 6, the front frame 5 thus being maintained in the desired inclined position so that when the cutting operation in the room has been completed, by simply connecting the chain 19 to the chain hook 21 at rear of the frame 6 in a well known manner, and starting the motor, the machine may be moved by its own power up the frame 5 and longitudinally thereof over the hinges 17 to depress the latter and thereby raise the frames 5 and 6 to horizontal position, the gear 11 on the machine subsequently moving into engagement with the pinion 12 on the truck, whereupon the truck is ready to be propelled about the mine as desired.

It will be noted that in my improved construction, the action of the hinge is entirely automatic, the machine automatically dropping the front of the truck, and the weight of the rear end of the truck acting to hold the front end in its tilted position until the machine is returned to its normal position on the truck. It will also be noted that through my improved construction the weight of the machine itself acts to depress the hinge between the parts of the truck in such a manner as, when the weight of the machine is upon the truck, to make the latter entirely rigid. Attention is also directed to the fact that through my improved construction, all necessity for the provision of separate locking means or holding means to hold the truck in elevated position is obviated, at the same time that the construction of the truck itself is rendered exceedingly simple and its cost is materially reduced. These and other advantages of my improved construction will, however, be clearly apparent to those skilled in the art.

While I have in this application specifically described one embodiment which my invention may assume in practice, it should be understood that the form shown herein is used only for purposes of illustration and that the invention is capable of being embodied in various other forms without departing from its spirit, it being my intention to include all such modifications within the scope of the appended claims.

What I claim as new and desire to secure by Letters Patent is:—

1. In a mining machine truck, a plurality of normally angularly disposed wheeled frames, each mounted on a pair of supporting wheels and each bodily vibratable vertically around the axis of its wheels, and means pivotally connecting their adjacent ends.

2. In a mining machine truck, a plurality of normally angularly disposed wheeled guide frames, each supported upon a pair of wheels and each bodily vibratable vertically around the axis of its wheels, and means pivotally connecting the frame at a transverse line between the axes of their wheels.

3. In a mining machine truck, a plurality of movable normally angularly disposed frame members pivotally connected at their adjacent ends, and a pair of wheels supporting each of said members and arranged to permit it to vibrate bodily vertically around the axis of said pair of wheels while said wheels are stationary.

4. In a mining machine truck, a plurality of movable pivotally connected normally angularly disposed frame members, each mounted upon a pair of wheels and bodily vibratable vertically around the axis of its wheels, and means for moving the pivot which connects the said members bodily vertically to bring the said members into alinement.

5. In a mining machine truck, a plurality of wheeled frame members pivotally connected at a point between their wheels, and truck driving mechanism at one end of one of said frames and connected to its wheels.

6. In a mining machine truck, a plurality of frame members of different lengths normally positioned at an obtuse angle relatively to the ground, and means pivotally connecting the adjacent ends of said members, each member having a wheeled support arranged relatively to its inner end to have its outer end normally tend to move downward.

7. In a mining machine truck, a plurality of movable normally angularly disposed pivotally connected frame members, wheels supporting one frame member, supplemental wheels supporting the other frame member, said wheels being arranged to have the outer ends of the frame members move downward and simultaneously raise the inner adjacent ends, and means for moving the pivotal connecting devices to bring the frame members into alinement.

8. In a mining machine truck, a plurality of frame members pivotally connected and normally disposed at an obtuse angle, one relative to the other, and forming a rigid construction when their pivotal connection is maintained depressed, said frame members both being movable toward and from the horizontal plane in which the pivotal connection lies when it is depressed.

9. In a mining machine truck, in combination, a plurality of wheeled frame members pivotally connected together at a transverse line between the axes of their wheels, and both adapted to vibrate to and from positions inclined to the horizontal while all their wheels remain in horizontal planes and one of said members being adapted to provide a guideway extending from the ground to its pivoted end, and a mining machine adapted to move in said guideway and when normally disposed on said frames to depress the pivotal connection between them.

10. In a mining machine truck, a plurality of pivotally connected mutually movable frame members, wheels supporting the same, and a track beneath said wheels, one of said members being adapted to engage the ground prior to the engagement of the other with said track.

11. In a mining machine truck, two frames pivotally connected at their adjacent ends, a pair of supporting wheels for each frame, the latter being bodily vibratable vertically around the axis of its wheels and braking mechanism on one of the said frames adapted to retard the revolution of one or more of said wheels irrespective of the position of said frame.

12. In a mining machine truck, a plurality of wheeled frame members pivotally connected at points between their wheels and movable into an angle relative to the ground, one of said frame members being longer than the other, and truck driving mechanism carried on the rear end of the other frame member.

13. In a mining machine truck, a plurality of normally angularly disposed wheeled frame members pivotally connected at a point in front of the rear wheel, and means carried on one of said members and operatively connected to one of said wheels for driving the latter.

14. In a mining machine truck, a plurality of normally angularly disposed wheeled frame members pivotally connected at a point in front of the rear wheels, and truck driving mechanism carried on one of said frames and operatively connected to said last mentioned wheels and movable with said frame about the axis of said wheels.

15. In a mining machine truck, a plurality of wheeled normally angularly disposed machine guiding members pivotally connected at a point in front of the rear wheels, truck driving mechanism connected to one of said wheels, and operative connections between the remaining wheels.

16. In a mining machine truck, a plurality of wheeled normally angularly disposed machine guiding frame members pivotally connected at a point in front of the rear wheels, and means carried on one of said members and operatively connectible with a machine and with said truck wheels for driving the latter.

17. In a mining machine truck, a plurality of wheeled normally angularly disposed machine guiding frame members pivotally connected at a point in front of the rear wheels, and truck driving mechanism including a member carried on one of said members and engageable with a moving part of a machine reciprocable longitudinally of said frame members.

18. In a mining machine truck, a plurality of pivotally connected wheeled machine supporting frames, and means whereby as a load is removed from said supporting frames the elevation of the pivotal connection between the same is automatically varied.

19. In a mining machine truck, a plurality of pivotally connected wheeled machine supporting frames, and means whereby as a load is removed from said supporting frames the pivotal connection between the same is automatically raised.

20. In a mining machine truck, a plurality of pivotally connected wheeled machine supporting frames, and means whereby as a load is removed from said supporting frames the pivotal connection between the same is automatically raised and the extremity of one end of the same lowered farther than the extremity of the other.

21. In a mining machine truck, a short rear wheeled frame, an axle on which said frame is pivoted, truck driving mechanism carried on said frame and connected to said axle including a brake, and a complementary wheeled frame member pivotally connected to said first mentioned frame member at a point in front of its axle.

22. In a mining machine truck, a plurality of movable frame members pivotally connected at their adjacent ends, truck driving mechanism at the rear end of one of said frames, wheels supporting said frames, and a mining machine movable longitudinally of said frames into operative connection with said truck driving mechanism.

23. In a mining machine truck, a plurality of movable frame members pivotally connected at their adjacent ends, truck driving mechanism at the rear end of one of said frames, wheels supporting said frames, and a mining machine movable out of operative connection with said truck driving mechanism and progressively over said frames.

24. In combination, a plurality of wheeled frame members pivotally connected at a point between their wheels, truck driving and braking mechanism on one of said members for locking the wheels thereof when the same is at any angle with respect to the ground, and a mining machine normally depressing the pivotal connection between said frames and engageable with said truck driving mechanism.

25. In a mining machine truck, a plurality of pivotally connected wheeled machine supporting frames, means whereby as a load is removed from said supporting frames the pivotal connection between the same is automatically raised and the extremity of one end of the same lowered farther than the extremity of the other, and a machine normally supported on said frames and movable longitudinally thereof.

26. In a mining machine truck, a plurality of pivotally connected wheeled machine supporting and guiding frames, means whereby as a load is removed from said frames the pivotal connection between the same is automatically raised and the extremity of one end of the same lowered farther than the extremity of the other, a machine normally supported on said frames and movable longitudinally thereof, and truck driving mechanism carried on one of said frames and operatively connectible with said machine.

27. In combination, a plurality of pivotally connected truck elements, one of said elements being adapted to form an inclined plane along which a machine may move in loading and unloading, the other of said elements having truck driving mechanism thereon and a member to which a flexible haulage member may be secured when a machine is moving onto said truck, and said first mentioned element having an open end through which said haulage member extends during loading of said truck.

28. In combination, a plurality of pivotally connected truck elements, one of said elements being adapted to form an inclined plane along which a machine may move in loading and unloading, the other of said elements having truck driving mechanism thereon and a member to which a flexible haulage member may be secured when a machine is moving onto said truck, and said first mentioned element having an open end through which said haulage member extends during loading of said truck, and which a machine overlies when in truck-driving position.

In testimony whereof I affix my signature.

MORRIS P. HOLMES.